D. A. SINE.

DRILL HOLDER.

APPLICATION FILED MAR. 11, 1912.

Reissued Apr. 23, 1912.

13,408.

Witnesses

A. M. Whitmore.

Allie M. Sine

Inventor

David A. Sine

By H. H. Simms his Attorney

UNITED STATES PATENT OFFICE.

DAVID A. SINE, OF ROCHESTER, NEW YORK, ASSIGNOR OF ONE-HALF TO ALLIE M. SINE, OF ROCHESTER, NEW YORK.

DRILL-HOLDER.

13,408. Specification of Reissued Letters Patent. Reissued Apr. 23, 1912.

Original No. 1,018,729, dated February 27, 1912, Serial No. 575,289. Application for reissue filed March 11, 1912. Serial No. 683,000½.

*To all whom it may concern:*

Be it known that I, DAVID A. SINE, of Rochester, in the county of Monroe and State of New York, have invented a new and useful Improvement in Drill-Holders, which improvement is fully set forth in the following specification and shown in the accompanying drawings.

The present invention relates to drill holders and it has for an object to provide a construction which may also be utilized to determine the gage of a drill.

Another object of the invention is to provide a construction in which the drills are held compactly, but which has provision whereby the drills may be easily reached.

To these and other ends, the invention consists of certain parts and combinations of parts all of which will be hereinafter described, the novel features being pointed out in the appended claims.

Figure 1:
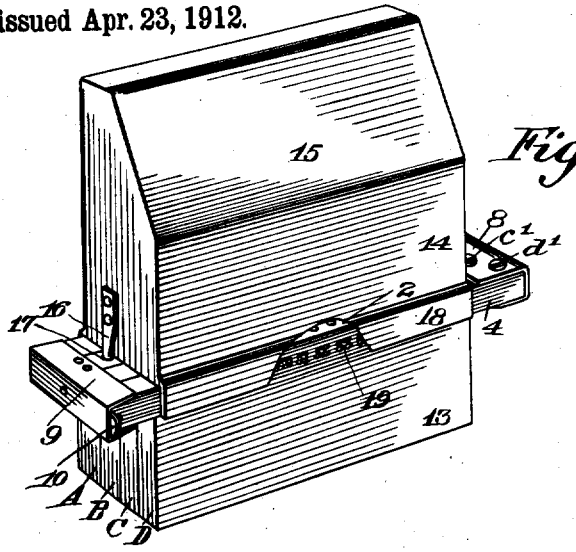
Figure 2:
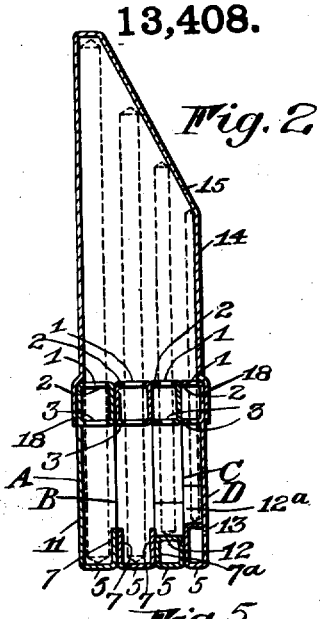
Figure 3:
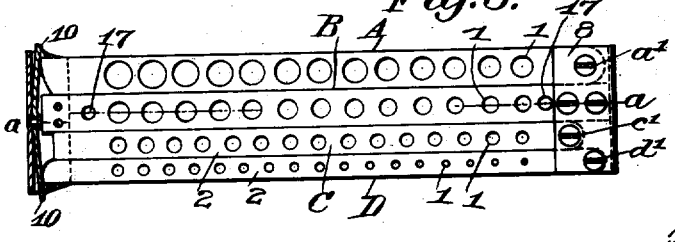
Figure 5:
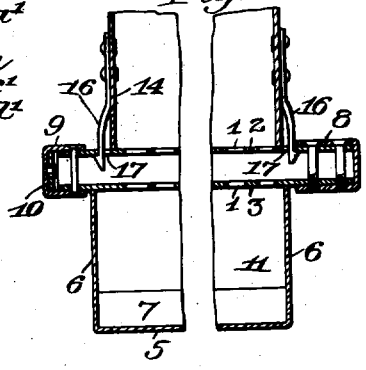
Figure 4:
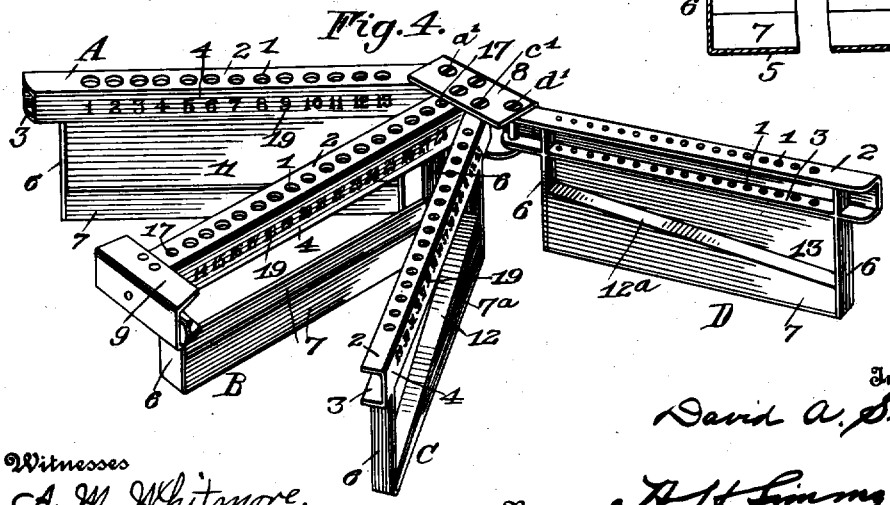

In the drawings: Figure 1 is a perspective view of a drill holder constructed in accordance with this invention, a part of the cover being broken away; Fig. 2 is a vertical transverse section of the holder illustrated in Fig. 1; Fig. 3 shows the top of the holder with the cover removed, a part being shown in section; Fig. 4 shows the holder with its members separated, and Fig. 5 is a detail sectional view on line *a—a* of Fig. 3.

At the present time, drills are so held that every time it is desired to use one, a workman must gage quite a number before he obtains one of a size suited for his work. With this invention the workman gages the drill immediately after use and it is held by the gage until it is again called into use. As only a few of the drills are removed it is of course possible to gage a drill quickly by merely looking for unfilled sockets. The sizes of the sockets are constant for the latter are formed of metal which does not absorb the oil on the drills and swell under the action thereof, as it would if made of wood. Means may also be provided for retaining the drills in the sockets so that the holder may be carried around with other tools without the drills dropping from the holder.

The holder may also be so constructed that, while the drills may be held close together when it is not desired to use them, yet they may be separated on the holder when it is desirable to remove them. The holder in this instance comprises a plurality of members A, B, C and D each having a row of drill holding devices such as pockets. These members in one position lie close together in parallel relation as shown in Figs. 1 to 3 so that a compact arrangement of the drills is provided, but they may be separated so that any drill may be removed without interfering with the others. Preferably this separation is effected by pivoting the members A, C and D at *a′ c′ d′* to the member B.

The member B comprises a plurality of plates 2 and 3 arranged one above another and each provided with a plurality of openings, the openings in the lower plate being coincident with those of the upper plate to provide the drill holding pockets 1. The plates may be connected at their edges by plates 4 and the whole may be formed from sheet metal bent into a tube of rectangular cross section to provide the parts 2, 3, and 4. The drills in the member B rest at their lower ends on a rest or base piece 5 arranged below the plates 2 and 3 and preferably connected to the latter by uprights 6, the uprights and the plates 5 being strengthened by flanges 7 if desirable.

The ends of the tubular portion extend beyond the uprights 6 and have channel members or cross pieces 8 and 9 secured to the upper and lower faces so as to extend from opposite sides thereof, said pieces 8 and 9 serving respectively to support the pivots *a′ c′ d′* and the spring latches 10. The piece 8 has portions of the members A, C and D pivotally arranged in its groove or channel, while the piece 9 receives within its groove the free ends of the members so that the latter may be engaged by the latches 10.

The member A is pivoted on one side of the member B and is constructed substantially the same as said member B, except that a wall or covering plate 11 is provided on the outer side of the depending uprights 6.

The member C is pivoted on the side of the member B opposite the member A and has but one plate 4 connecting the plates 2 and 3. As the drills supported by the member C progressively decrease in length, the rest 12 is arranged on an incline and is supported by the flanges 7ª extended upwardly from the base piece 5.

The member D is substantially the same as the member C and is arranged on the outside of the latter. The rest 12ª is also inclined like the rest 12 but is arranged in a higher plane then the latter and the outer sides of the uprights 6 are connected by a wall or covering plate 13 serving to inclose the drills.

The tool holder may be provided with a cover 14 and the latter may have an inclined wall 15 to coöperate with the free ends of the drills to prevent movement of the latter in their pockets, each row of drills having their upper ends at a height different from the others and the members of each row having their upper ends at the same height owing to the inclined rests.

The cover is preferably entirely removable and to this end may have spring latches 16 on opposite sides to engage in recesses 17 in the member B. The cover may also be utilized for holding the members A, B, C, and D against relative movement and to this end it may be provided with depending flanges 18 on opposite sides to coöperate with the outer sides of the members A and D. Of course, the latches 10 may be omitted and the cover alone serve as the securing means for the members A to D but the latches 10 are useful when the holder is being employed without the cover.

In order that the size of the several pockets may be indicated the plates 4 have the characters 19 noted thereon. The characters are thus vertically arranged in proximity to their respective pockets so that the user may obtain quickly the tool he desires.

In use the drills are inserted into the proper pockets as shown in Fig. 2, the cover engaging their upper ends to prevent movement. A pull on the cover removes the same as the engagement between the latches and the drill holder is so formed that no sharp shoulders are provided yet there is sufficient engagement to prevent accidental disconnection and if it is desired to use a drill the frames A to D are moved relatively to each other so that plenty of space is provided on opposite sides of each drill to premit it to be grasped. Of course all of the indicating characters are also exposed upon the separation of the members.

With a drill holder constructed in accordance with this invention, the drills are so held and indicated that any desired one may be obtained very quickly.

The holder when folded takes up but little space and it may be expanded to permit any drill to be removed without interference with the others.

The cover holds the tools in place and permits the holder to be carried loosely in a tool chest without the tools becoming scattered.

What I claim as my invention and desire to secure by Letters Patent is:

1. A drill holder comprising a plurality of members each having a plurality of drill holding devices, and transverse pieces at the ends of said members, one of said pieces having the other members pivoted thereto, and the other piece carrying securing means for the free ends of the pivoted members.

2. A drill holder comprising a plurality of members having a plurality of drill holding devices and pieces secured transversely of one of said members at the ends thereof, one of said pieces having the other members pivoted thereto and the other of said pieces being of U-shape in cross section and serving to guide the free ends of the pivoted members.

3. A drill holder comprising a plurality of members each having a plurality of drill holding devices, and pieces of U-shaped cross section secured transversely of one of said members, one of said pieces having the other members pivoted thereto and the other of said pieces serving to guide the pivoted members.

4. A drill holder comprising a plurality of members, each having a plurality of drill holding devices, a device secured to and extending transversely of an intermediate one of said members and projecting beyond both sides thereof near one end, the other members being pivoted to said device, and locking means carried by the other end of said member.

5. A drill holder comprising a plurality of members each having a plurality of drill-holding devices, pivotal connection between one of said members and the others, and a grooved device carried by said member and receiving portions of the other members.

6. A drill holder member comprising a pair of horizontal plates provided with coincident openings, and a vertical plate connecting them and formed from a single piece of sheet material therewith, uprights depending from horizontal plates, a base piece connecting the lower ends of the uprights, and an inclined rest arranged above the base piece and between uprights.

7. A drill holder comprising a plurality of members each of which has a plurality of drill holding devices, transverse pieces of U-shaped cross section arranged at opposite ends of one of said members, one of said pieces having the other member pivoted thereto on opposite sides of the member by which said piece is carried, and latches carried by the other piece to hold said pivoted members against movement.

8. A drill holder comprising a plurality of relatively movable members, each embodying a rest, uprights at the ends of the rests, and drill sustaining portions connecting the uprights and projecting beyond the same, and means for connecting the projecting portions on both sides of the uprights.

9. A drill holder comprising a plurality of relatively movable members each consisting of a pair of horizontal pieces provided with coincident openings, rests each arranged below one of said pairs of pieces and uprights supporting said rests, the horizontal pieces projecting beyond the uprights, means pivotally connecting the projecting ends on one side of the uprights, and means for securing the other projecting ends on the other side of the uprights.

DAVID A. SINE.

Witnesses:
H. H. SIMMS,
ALLIE M. SINE.

Copies of this patent may be obtained for five cents each, by addressing the "Commissioner of Patents, Washington, D. C."